United States Patent Office 3,254,597
Patented June 7, 1966

3,254,597
PLANOGRAPHIC PRINTING PLATES
Robert T. Hart, West Falmouth, and Glenn H. Perkins, West Peru, Maine, assignors to Oxford Paper Company, Rumford, Maine, a corporation of Maine
No Drawing. Filed Aug. 3, 1962, Ser. No. 214,536
5 Claims. (Cl. 101—149.2)

This invention relates to planographic printing plates and more particularly to the reproduction of images from such plates which have been insolubilized by ammonium zirconyl carbonate.

Offset or planographic printing plates are used to reproduce images which have been applied to the planographic surface of the plate. The image is oleophilic in nature in that it attracts oily or greasy substances and is essentially water repellent. The unimaged portion of the planographic surface is hydrophilic to the extent that it can easily be wet by water but it can also, before wetting, accept and hold an oily or greasy image. Planographic surfaces must have this hydrophilic-oleophilic balance so that the oily or greasy image can be applied thereto and the unimaged area wet by water. The planographic surface thus prepared and imaged is subjected to treatment by an etch solution which prepares the plate for printing. The etch solution is repelled by the image portion of the plate but is attracted by the unimaged area. The unimaged area, therefore, is covered by a surface film of the etch solution leaving the image portion alone ink receptive.

A planographic printing plate thus prepared can operate on an offset printing press whereby the plate is alternately contacted by a roll supplying water and a roll supplying ink. After the image has been inked, it is transferred from the plate to a rubber blanket and from the blanket to the copy paper.

The printing plates produced according to this invention possess an excellent hydrophilic-oleophilic balance permitting good image adherence and good image life while at the same time permitting good water (or etch solution) retention. Planographic surfaces prepared as disclosed herein produce clean copy, good toning, and possess good image, correction life, and "stop-go" properties. These plates are easily insolubilized and therefore require, in general, fewer color ingredients and fewer machine passes than are ordinarily employed. The cost of producing these plates is correspondingly reduced.

Broadly, the invention involves employing, as a planographic printing plate, a specially coated base material. The base material is usually paper but can also be any other suitable wet strength web. The coating is prepared by forming an aqueous coating composition comprising a suitable pigment, a hydrophilic colloid, and ammonium zirconyl carbonate. The paper is coated with this coating composition and dried so as to effect a liberation of ammonia from the ammonium zirconyl carbonate. Advantageously heat is employed, 200° F. for one minute being generally suitable.

Ammonium zirconyl carbonate, used as the insolubilizing agent in accordance with the present invention, is stable in aqueous medium at a pH within the range from about 5 to about 10, so long as the aqueous medium remains at normal temperatures, and in the stable condition the ammonium zirconyl carbonate is ineffectual in insolubilizing, precipitating or gelling the herein specified hydrophilic colloids within practical time limits. Also, wthin the specified pH range, the ammonium zirconyl carbonate, or a decomposition product thereof, is highly effective in quickly insolubilizing these hydrophilic colloids when the aqueous solution is heated to a moderate temperature as previously described.

Ammonium zirconyl carbonate is commercially available and can be easily prepared. As described by Ogawa,* ammonium zirconyl carbonate can be prepared by reacting zirconyl chloride with an excess of ammonium bicarbonate at a pH of 6.5 to 7.0. Also, as described by Van Mater in United States Patent No. 2,457,853, ammonium zirconyl carbonate can be prepared by reaction of zirconyl sulfate with ammonium carbonate. Thus it can be seen that ammonium zirconyl carbonate, $(NH_4)_3HZrO(CO_3)_3$, is a wholly inorganic polyvalent metal ion compound of known molecular constitution that is prepared commercially from readily available, inexpensive starting materials all of which are of an inorganic nature.

The hydrophilic colloids which are used according to this invention are readily determined by routine experimentation by one skilled in the art. The hydrophilic colloid must, of course, be suitable for use in planographic printing plates and must be capable of being insolubilized by the ammonium zirconyl carbonate so as to form a planographic surface having the proper hydrophilic-oleophilic balance. Examples of suitable hydrophilic colloids include polyvinyl alcohol (marketed by E. I. du Pont de Nemours & Co., Inc. under the tradename, Elvanol 72–60); water soluble modified starch (manufactured by Hercules Powder Co. under the tradename, Ceron N 4S); low viscosity sodium carboxymethyl cellulose (marketed by Hercules Powder Co. under the trade name, CMC 7A); corn hull gum; dextran; dextrin; carboxymethyl hydroxyethyl cellulose; polyacrylic acid (manufactured by Rohm & Haas Company under the trade name, Acrysol A–3); styrene-maleic anhydride copolymer (manufactured by Texas Butadiene & Chemical Corp. under the trade name, SMA 6000–N); oxidized corn starch (marketed by the National Starch and Chemical Corp. under the trade name, Flokote 64). Oxidized corn starch is common corn starch which has been treated in an aqueous suspension with a hypochlorite solution containing a slight excess of sodium hydroxide.

The pigments which can be used according to this invention include those which are commonly used in the preparation of planographic printing plates. Examples of such pigments are colloidal silica, calcium silicate, barium sulfate, titanium dioxide, and clays such as kaolin, e.g., Lustra Clay. Lustra Clay is marketed by the Southern Clay Company. The pigments may be used as a mixture if desired.

The amount of ammonium zirconyl carbonate which may be used can vary considerably depending upon, for example, the particular hydrophilic colloid, pigment, or additives employed. When oxidized starch is used, the amount of ammonium zirconyl carbonate based on the dry weight of the starch can vary from 10% to 100% with 30% to 50% being the preferred range. When polyvinyl alcohol is used, the amount of AZC can vary from 5% to 60% with 25% to 50% being the preferred range. The amounts of pigment which can be used can also vary quite widely depending upon the particular hydrophilic colloid employed. A pigment-hydrophilic colloid ratio of about 2:1 to about 7:1 is generally suitable although both higher and lower ratios can be used. When using sodium carboxymethyl cellulose, for example, as the hydrophilic colloid, it is advantageous to maintain the pigment colloid ratio about 5:1.

The coating compositions used to form the printing plates of this invention can possess a pH between about 5 to 10. Although even a higher or lower pH may be employed, it is found to be advantageous to use a pH of from about 6 to 7 in these coating compositions. The pH of the coating compositions may be adjusted to the ---
*Osaka Furitsu Kogyo-Shoreikan Hokoku, 19:67–70 (1958).

proper pH range by the use of acetic acid, ammonia, morpholine, caustic soda and the like.

The aqueous coating compositions may be applied to a base web or sheet by conventional apparatus, such as air knives or roll coaters. The amount of coating may vary from about 2 to 10 pounds per ream of 3300 square feet, with 6 to 8 pounds being most satisfactory. Advantageously, the coating composition comprising the hydrophilic colloid, pigment and ammonium zirconyl carbonate is coated on a paper base and then heated to a temperature at which the ammonium zirconyl carbonate is decomposed, liberating ammonia. The duration of such heating is subject to considerable variation depending primarily upon the temperature. For instance, at temperatures of about 200° F., a time period of about one minute has, in many cases, been found adequate. At higher temperatures, even shorter heating periods will suffice. Care should, of course, be exercised to avoid temperatures so high as to cause deterioration of the adhesive or base material. A combination of air-drying and heating may be employed.

The insolubilization of the hydrophilic colloid can be assisted, if desired, by including within the coating composition a small amount of a cross-linking resin such as a cationic thermosetting polyamide resin (manufactured by Hercules Powder Company under the trade name Kymene 557, and more fully described in U.S. Patent 2,926,154). Soaps such as soduim stearate may be employed. Defoaming agents such as butyl alcohol may advantageously be employed.

The coating compositions produced according to this invention are advantageously prepared by first preparing the pigment or pigment mixture, and adding thereto the hydrophilic colloid, while stirring. Next, the ammounium zirconyl carbonate is then added. The mixing may be done at room temperature and the viscosity of the mixture is advantageously adjusted to about 200 centipoises, Brookfield. The pH can be adjusted by adding ammonia or acetic acid to bring the pH to between 5 and 10 and preferably to about 6.5. If desired, a base paper may be coated with a coating composition containing the pigment and hydrophilic colloid and thereafter the coated paper may be contacted with a solution of the ammonium zirconyl carbonate and then dried.

In order further to illustrate the present invention, reference is made to the examples set forth below. It is to be understood, however, that the invention is not limited to such specific examples. Parts are by weight.

*Example 1*

A coating composition is prepared by mixing together 100 parts of an 8% solution of polyvinyl alcohol (Elvanol 72-60), 54 parts of a 60% solution of clay (Lustra Clay), 20 parts of a 20% solution of ammonium zirconyl carbonate, and 3 parts of butyl alcohol. The coating composition is applied to a suitable wet strength paper stock and dried for about a minute at 200° F. The resulting planographic printing plates are evaluated on a 1250 offset printing press and satisfactory results are obtained in that the planographic plates produce a clean copy and possess a good image, correction life, and stop-go properties.

*Example 2*

The procedure of Example 1 is followed except that the coating composition contains 104 parts of a 60% solution of clay (Lustra Clay), 125 parts of a 30% solution of colloidal silica (manufactured by Monstanto Chemical Co. under the trade name, Syton 200), 67 parts of a 30% solution of starch (Flokote 64), 200 parts of a 5% solution of a styrene-maleic anhydride copolymer (SMA 6000-N), 20 parts of a 10% solution of sodium stearate, and 20 parts of a 20% solution of ammonium zirconyl carbonate. The planographic printing plates are evaluated on a 1250 offset printing press and, as in Example 1, satisfactory results are obtained.

*Example 3*

The procedure of Example 1 is followed except that the coating composition used contains 167 parts of a 60% solution of clay (Lustra Clay), 67 parts of a 30% solution of starch (Flokote 64), 200 parts of a 5% solution of styrene-maleic anhydride copolymer (SMA 6000-N), and 20 parts of a 10% solution of sodium stearate, and 20 parts of a 20% solution of ammonium zirconyl carbonate. The planographic printing plates are evaluated on a 1250 offset printing press and, as in Example 1, satisfactory results are obtained.

*Example 4*

The procedure of Example 1 is followed except that the coating composition used contains 100 parts of a 7% solution of sodium carboxymethyl cellulose (CMC 7A), 47 parts of a 60% solution of clay (Lustra Clay), 23 parts of a 20% solution of ammonium zirconyl carbonate, 25 parts of a cationic thermosetting polyamide resin (Kymene 557), and 3 parts of butyl alcohol. The planographic printing plates are evaluated on a 1250 offset printing press and, as in Example 1, satisfactory results are obtained.

*Example 5*

The procedure of Example 1 is followed except that the coating composition contains 34 parts of a 30% solution of starch (Flokote 64), 42 parts of a 60% solution of clay (Lustra Clay), 50 parts of a 30% solution of colloidal silica, 25 parts of a 20% solution of ammonium zirconyl carbonate, 3 parts of butyl alcohol, and 20 parts of water. The planographic printing plates are evaluated on a 1250 offset printing press and, as in Example 1, satisfactory results are obtained.

*Example 6*

The procedure of Example 1 is followed except that the coating composition contains 54 parts of a 60% solution of clay (Lustra Clay), 40 parts of a 20% solution of starch (Flokote 64), 20 parts of a 20% solution of ammonium zirconyl carbonate (pH 8) and 2 parts of butyl alcohol. The planographic printing plates are evaluated on a 1250 offset printing press and, as in Example 1, satisfactory results are obtained.

*Example 7*

The procedure of Example 6 is followed except that the pH is 6.5 instead of 8. The result is that a planographic printing plate is somewhat superior to the one produced by Example 6.

*Example 8*

The procedure of Example 1 is followed except that the coating composition contains 54 parts of a 60% solution of clay (Lustra Clay), 80 parts of a 10% solution of starch (Flokote 64), 24 parts of a cationic thermosetting polyamide resin (Kymene 557), 20 parts of a 20% solution of ammonium zirconyl carbonate, and 2 parts of butyl alcohol. The planographic printing plates are evaluated on a 1250 offset printing press and, as in Example 1, satisfactory results are obtained.

*Example 9*

The procedure of Example 1 is followed except that the coating composition contains 100 parts of an 8% solution of corn hull gum, 54 parts of a 60% solution of clay (Lustra Clay), 20 parts of a 20% solution of ammonium zirconyl carbonate and 3 parts of butyl alcohol. The planographic printing plates are evaluated on a 1250 offset printing press and, as in Example 1, satisfactory results are obtained.

*Example 10*

The procedure of Example 1 is followed except that the coating composition contains 134 parts of a 6% solution of dextran, 54 parts of a 60% solution of clay (Lustra Clay), 30 parts of a 20% solution of ammonium zirconyl carbonate, and 3 parts of butyl alcohol. The planographic printing plates are evaluated on a 1250 offset printing press and, as in Example 1, satisfactory results are obtained.

*Example 11*

The procedure of Example 1 is followed except that the coating composition contains 32 parts of a 25% solution of dextrin, 54 parts of a 60% solution of clay (Lustra Clay), 30 parts of a 20% solution of ammonium zirconyl carbonate, and 3 parts of butyl alcohol. The planographic printing plates are evaluated on a 1250 offset printing press and, as in Example 1, satisfactory results are obtained.

*Example 12*

The procedure of Example 1 is followed except that the coating composition contains 160 parts of a 5% solution of carboxymethyl hydroxyethyl cellulose, 54 parts of a 60% solution of clay (Lustra Clay), 20 parts of a 20% solution of ammonium zirconyl carbonate and 3 parts of butyl alcohol. The planographic printing plates are evaluated on a 1250 offset printing press and, as in Example 1, satisfactory results are obtained.

*Example 13*

The procedure of Example 1 is followed except that the coating composition contains 80 parts of a 10% solution of polyacrylic acid * manufactured by Rohm and Haas Company under the trade name, Acrysol A-3), 54 parts of a 60% solution of clay (Lustra Clay), 60 parts of a 20% solution of ammonium zirconyl carbonate, 3 parts of butyl alcohol. The planographic printing plates are evaluated on a 1250 offset printing press and, as in Example 1, satisfactory results are obtained.

*Example 14*

The procedure of Example 1 is followed except that the coating composition contains 80 parts of a 10% solution of a water soluble modified starch (manufactured by Hercules Powder Co. under the trade name, Ceron N 4S), 54 parts of a 60% solution of clay (Lustra Clay), 60 parts of a 20% solution of ammonium zirconyl carbonate, and 3 parts of butyl alcohol. The planographic printing plates are evaluated on a 1250 offset printing press and, as in Example 1, satisfactory results are obtained.

*Made ammoniacal before adding to color.

*Example 15*

The procedure of Example 1 is followed except that the coating composition contains 16.5 parts of a 30% solution of starch (Flokote 64), 33.3 parts of a 15% solution of polyvinyl alcohol (Elvanol 70-05), 84 parts of a 60% solution of clay (Lustra Clay), 30 parts of a cationic thermosetting polyamide resin (Kymene 557), 12.5 parts of a 20% solution of ammonium zirconyl carbonate and 3 parts of butyl alcohol. The solids content is increased to 52.3% and the coating composition is applied at a C2S (coated two sides) coat weight of 14-16 lbs. The planographic plates are evaluated on a 1250 offset printing press and the plates have improved properties over the formulations using only starch.

We claim:

1. A planographic printing plate comprising a base and, adhered thereto, an insolubilized coating which comprises a pigment and the reaction product of a hydrophilic colloid and ammonium zirconyl carbonate, the surface of said planographic printing plate having an ink receptive image thereon.

2. The planographic printing plate of claim 1, in which the base is a paper base.

3. The planographic printing plate of claim 1, in which the hydrophilic colloid is polyvinyl alcohol.

4. The planographic printing plate of claim 1, in which the hydrophilic colloid is starch.

5. A method of making a planographic printing plate which comprises forming an aqueous coating composition comprising a pigment, a hydrophilic colloid and ammonium zirconyl carbonate, coating the composition on to a paper base, drying the aqueous coating composition on said paper base with heat to form a reaction product of the hydrophilic colloid and the ammonium zirconyl carbonate to produce an insolubilized hydrophilic colloid, and then placing an ink receptive image on the dried coating.

References Cited by the Examiner

UNITED STATES PATENTS

| | | | |
|---|---|---|---|
| 2,814,988 | 12/1957 | Bradstreet et al. | 101—149.2 |
| 2,964,403 | 12/1960 | Beekman et al. | 96—75 |
| 3,020,839 | 2/1962 | Richard | 101—149.2 |
| 3,073,723 | 1/1963 | Deal et al. | 96—75 X |
| 3,081,199 | 3/1963 | Taylor | 117—156 |

FOREIGN PATENTS 678,187   8/1952   Great Britain.

DAVID KLEIN, *Primary Examiner.*